(12) United States Patent
Palanki et al.

(10) Patent No.: US 9,448,298 B2
(45) Date of Patent: Sep. 20, 2016

(54) TECHNIQUES FOR FASTER TIME-TO-FIRST-FIX

(71) Applicants: Ravi Palanki, San Jose, CA (US); Hui Chao, San Jose, CA (US); Saumitra Mohan Das, Santa Clara, CA (US); Rajarshi Gupta, Sunnyvale, CA (US); Behrooz Khorashadi, Mountain View, CA (US)

(72) Inventors: Ravi Palanki, San Jose, CA (US); Hui Chao, San Jose, CA (US); Saumitra Mohan Das, Santa Clara, CA (US); Rajarshi Gupta, Sunnyvale, CA (US); Behrooz Khorashadi, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/630,730

(22) Filed: Sep. 28, 2012

(65) Prior Publication Data

US 2014/0094199 A1   Apr. 3, 2014

(51) Int. Cl.
*H04W 24/00* (2009.01)
*G01S 5/02* (2010.01)
*G01S 19/05* (2010.01)
*H04W 64/00* (2009.01)

(52) U.S. Cl.
CPC .............. *G01S 5/0252* (2013.01); *G01S 19/05* (2013.01); *H04W 64/00* (2013.01)

(58) Field of Classification Search
CPC .. H04W 64/00; H04W 4/02; H04L 29/08657
USPC ............ 455/456.5, 456.1, 404.2, 414.1, 421, 455/466
See application file for complete search history.

(56) References Cited

U.S. PATENT DOCUMENTS

| | | | |
|---|---|---|---|
| 8,050,686 B1 | 11/2011 | Souissi et al. | |
| 8,060,085 B2 | 11/2011 | Goulder et al. | |
| 2003/0008662 A1* | 1/2003 | Stern et al. | 455/456 |
| 2008/0176583 A1 | 7/2008 | Brachet et al. | |
| 2011/0081919 A1 | 4/2011 | Das et al. | |
| 2011/0172906 A1 | 7/2011 | Das et al. | |
| 2011/0190004 A1 | 8/2011 | Tenny et al. | |
| 2011/0201350 A1 | 8/2011 | Das et al. | |
| 2012/0094639 A1* | 4/2012 | Carlson et al. | 455/414.1 |
| 2012/0208522 A1* | 8/2012 | Marklund | H04W 24/08 455/422.1 |
| 2013/0321424 A1* | 12/2013 | Pylappan et al. | 345/440 |

FOREIGN PATENT DOCUMENTS

| | | |
|---|---|---|
| TW | 515910 B | 1/2003 |
| TW | 200931053 A | 7/2009 |

OTHER PUBLICATIONS

International Search Report and Written Opinion—PCT/US2013/061262—ISA/EPO—Sep. 16, 2014.

\* cited by examiner

*Primary Examiner* — Nghi H Ly
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for a relatively faster time-to-first-fix, such as for use in or with a mobile communication device. Briefly, in accordance with at least one implementation, a method may include transmitting a first message to a mobile device, the first message comprising abbreviated positioning assistance data; receiving a second message from the mobile device, the second message comprising an indication of a coarse location of the mobile device; and transmitting a third message to the mobile device, the third message comprising a detailed tiled radio heat map obtained based, at least in part, on the received indication of the coarse location of the mobile device.

44 Claims, 5 Drawing Sheets

TECHNIQUES FOR FASTER TIME-TO-FIRST-FIX

BACKGROUND

1. Field

The present disclosure relates generally to position or location estimations of mobile communication devices and, more particularly, to techniques for a faster time-to-first-fix for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, location beacon, etc. via a cellular telephone or other wireless communications network. In some instances, acquired wireless signals may be processed by or at a mobile communication device, and its location may be estimated using known techniques, such as, for example, Advanced Forward Link Trilateration (AFLT), base station identification, or the like.

In an indoor environment, at times, certain mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, blocked, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like.

At times, an indoor location of a mobile communication device may be estimated via radio heat map signature matching, for example, in which current or live characteristics or signatures of wireless signals received at the device are compared with expected or previously measured signal characteristics stored as heat map values in a database. For example, during an off-line stage, a particular indoor area may be surveyed, and heat map values, such as in the form of observed characteristics of wireless signals indicative of received signal strength (e.g., RSSI, etc.), round-trip delay times (e.g., RTT, etc.), or the like may be collected or compiled. During an on-line stage, a mobile communication device may utilize heat map values, such as stored in a local memory or provided to the device (e.g., for a download, etc.) via a local server, for example, for matching against current or live signal signatures. By finding a signature in a database that more closely matches characteristics exhibited by signals currently received at a mobile communication device, a location associated with a matching signature may be used as an estimated location of the device.

In some instances, however, such as in larger indoor or like areas with multiple access points or feasible routes, for example, a radio heat map may be quite voluminous or comprehensive so as to tax available bandwidth in wireless communication links, memory of a mobile communication device, or the like. In addition, downloading or otherwise accessing voluminous or comprehensive radio heat maps may, for example, lead to longer latencies with respect to initial position estimations. This may also increase power consumption of certain mobile communication devices, such as mobile devices with limited power resources (e.g., battery-operated, etc.), for example, thus, affecting operating lifetime or overall utility of such devices.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
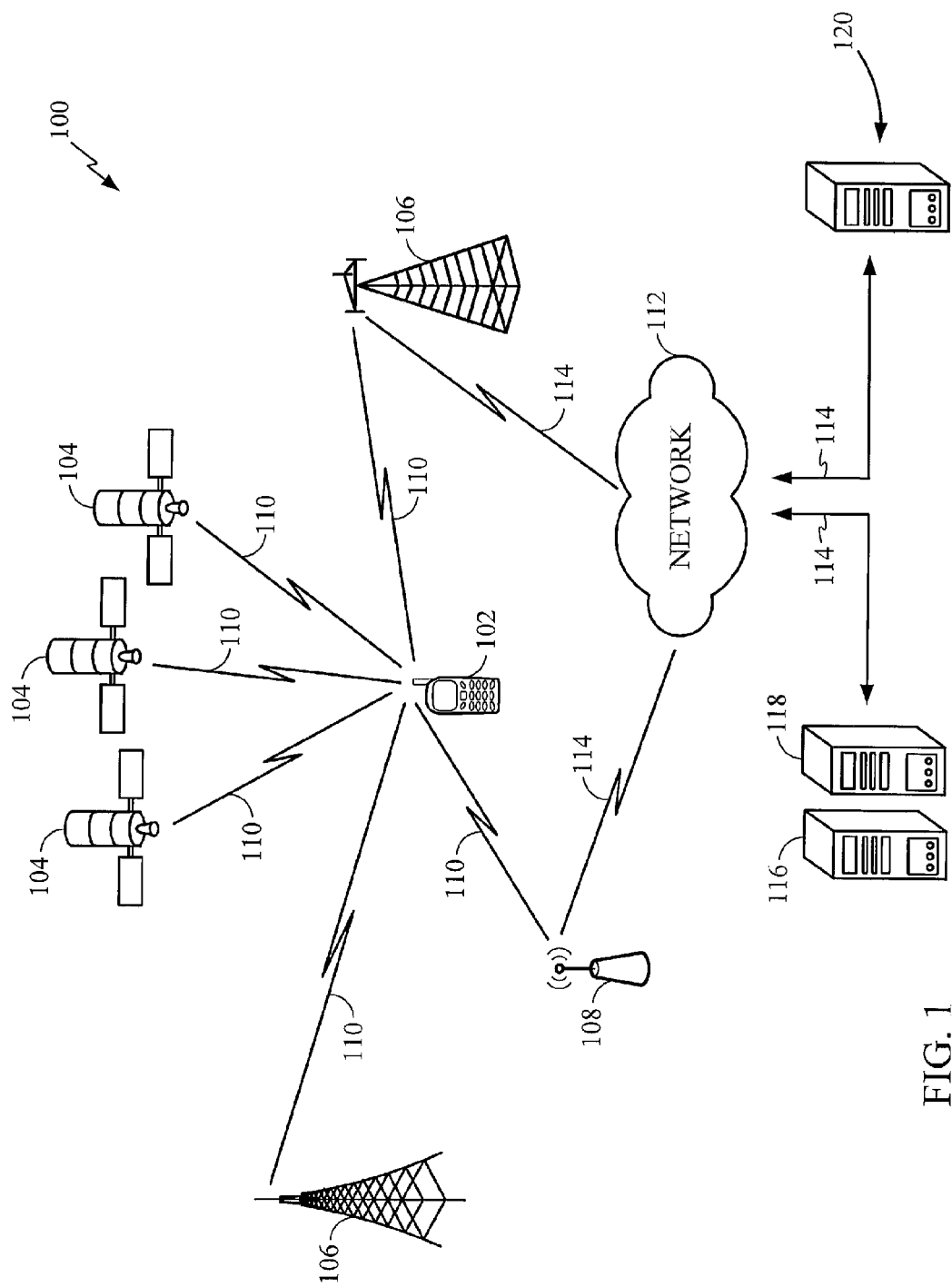
FIG. 1 is a schematic diagram illustrating features associated with an implementation of an example operating environment.

Example implementations relate to techniques for a relatively faster time-to-first-fix for use in or with a mobile communication device. In one implementation, a method may comprise transmitting a first message to a mobile device, the first message comprising abbreviated positioning assistance data; receiving a second message from the mobile device, the second message comprising an indication of a coarse location of the mobile device; and transmitting a third message to the mobile device, the third message comprising a detailed tiled radio heat map obtained based, at least in part, on the received indication of the coarse location of the mobile device.

In another implementation, an apparatus may comprise a mobile device comprising a wireless transceiver to communicate with a wireless network; and one or more processors programmed with instructions to obtain a first message received at the wireless transceiver, the first message comprising abbreviated positioning assistance data; initiate a transmission of a second message via the wireless transceiver, the second message comprising an indication of a coarse location of the mobile device; and obtain a third message received at the wireless transceiver, the third message comprising a detailed tiled radio heat map selected based, at least in part, on the transmitted indication of the coarse location of the mobile device.

In yet another implementation, an apparatus may comprise means for transmitting a first message to a mobile device, the first message comprising abbreviated positioning assistance data; means for receiving a second message from the mobile device, the second message comprising an indication of a coarse location of the mobile device; and means for transmitting a third message to the mobile device, the third message comprising a detailed tiled radio heat map obtained based, at least in part, on the received indication of the coarse location of the mobile device.

In yet another implementation, an article may comprise a non-transitory storage medium having instructions stored thereon executable by a special purpose computing platform to initiate a transmission of a first message to a mobile device, the first message comprising abbreviated positioning assistance data; obtain a second message received from the mobile device, the second message comprising an indication of a coarse location of the mobile device; and initiate a transmission of a third message to the mobile device, the third message comprising a detailed tiled radio heat map obtained based, at least in part, on the received indication of the coarse location of the mobile device. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for a relatively faster time-to-first-fix for use in or with a mobile communication device. As used herein, "mobile device," "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations or techniques for a relatively faster time-to-first-fix, and that claimed subject matter is not limited in this regard. It should also be noted that the terms "position" and "location" may be used interchangeably herein.

In this context, "time-to-first-fix" may refer to a temporal aspect of one or more operations or processes for computing an initial estimate of a location of a mobile device. As will be seen, in some instances, an initial estimate of a location of a mobile device may, for example, be computed in connection with one or more radio heat maps for an indoor or like environment. As alluded to previously, at times, a position fix, initial or otherwise, may be obtained based, at least in part, on positioning assistance data that may be selectively provided to a mobile device, such as by an indoor navigation system, location server, or the like. In some instances, positioning assistance data may comprise, for example, an electronic digital map (e.g., floor plans, etc.) associated with an indoor or like area of interest (e.g., a shopping mall, retailer outlet, etc.) that may be provided to a mobile device at or upon entering the area, just to illustrate one possible implementation. An electronic digital map may include, for example, indoor features of an area of interest, such as doors, hallways, staircases, elevators, walls, etc., as well as points of interest, such as restrooms, stores, entry ways, pay phones, or the like. An electronic digital map may, for example, be stored at a suitable server to be accessible by a mobile device, such as via a selection of a Uniform Resource Locator (URL), for example. By obtaining a digital map of an indoor or like area of interest, a mobile device may, for example, be capable of overlaying its current location over the displayed map of the area so as to provide an associated user with additional context, frame of reference, or the like.

At times, positioning assistance data may include, for example, one or more radio heat maps constructed for an indoor or like environment, as previously mentioned. A radio heat map may, for example, be provided in the form of heat map values or like metadata representing observed characteristics of wireless signals or so-called signal "signatures" indicative of expected signal strength (e.g., RSSI, etc.), round-trip delay times (e.g., RTT, etc.), or like characteristics at particular locations in an indoor or like area of interest. For purposes of explanation, typically, although not necessarily, a radio heat map may, for example, be defined, at least in part, by a grid of points laid over or mapped to a floor plan of an indoor or like area of interest at relatively uniform spacing (e.g., two-meter separation of neighboring grid points, etc.) and represent expected signal signatures at these points. A radio heat map may facilitate or support measurements of ranges to one or more wireless transmitters, such as one or more access points, for example, positioned at known fixed locations within an indoor or like area of interest. Thus, for a known wireless transmitter, a radio heat map may, for example, associate a particular grid point with a heat map value representative of an expected signal signature at the grid point. As such, heat map values associated with one or more known access points may, for example, enable a mobile device to correlate or associate observed signal signatures with locations within an indoor or like area of interest.

In some instances, a radio heat map may be provided or made available by a local server, such as for a download via one or more wireless communications links, for example, for each grid point covering an indoor or like area of interest. A downloaded radio heat map may, for example, be stored or "cached" in a local memory of a mobile device, such as for one or more subsequent signal signature matching operations in real or near real time. In this context, "real time" may refer to an amount of timeliness of information or signals, which may have been delayed by an amount of time attributable to electronic communication as well as other signal processing. As will be seen, in some instances, a radio heat map may be represented via a suitable metadata structure or data matrix, such as a heat map tiling covering an indoor or like area of interest, for example, wherein each heat map tile may comprise a rectangular tile corresponding to a heat map value. Typically, although not necessarily, "heat map tile" may refer to a region having one or more data points representing particular heat map values of corresponding signal characteristics (e.g., RSSI, RTD, etc.) within a suitable radio heat map data matrix or structure (e.g., a tiling, array, plot, etc.), tessellated or otherwise. Of course, these are merely examples relating to radio heat maps that may be provided to a mobile device to facilitate or support indoor positioning, and claimed subject matter is not so limited.

As alluded to previously, a radio heat map may be quite voluminous or comprehensive and, as such, may tax available network bandwidth, associated computational resources, or the like. In addition, a sheer volume of heat map metadata may, for example, lead to increased download or processing times, affect power consumption of a mobile device, or the like. Thus, in some instances, such as in larger indoor or like areas with multiple access points or feasible routes, for example, positioning or navigation capabilities of certain mobile devices may be less useful or possibly faulty. To illustrate, at times, there may be uncertainty as to a particular floor (e.g., of a shopping mall, etc.) on which a mobile device is located. To resolve this uncertainty, a mobile device may download multiple radio heat maps, such as for each floor within an associated area, for example. Again, this may be time-consuming, waste available communication link bandwidth, memory, etc. of a mobile device. In addition, in some instances, due, at least in part, to a limited memory capacity, coverage or metadata transfer plan, etc., a mobile device may be unable to reliably receive or download, for example, a radio heat map covering a relatively large indoor or like area into a local memory. As such, processing resources at a mobile device may not be capable of storing or accessing, for example, associated heat map values in a more efficient or effective manner to perform location determination. Accordingly, it may be desirable to develop one or more methods, systems, or apparatuses that may enable or otherwise improve mobile device location or navigation services, such as in connection with a radio heat map for an indoor or like environment, for example.

As will be described in greater detail below, in an implementation, a radio heat map covering an indoor or like area of interest may be subdivided into a plurality of non-overlapping heat map "tiles" of uniform or non-uniform dimensions, such as rectangular heat map tiles, for example, which may or may not be appended at the margins. As such, a radio heat map (e.g., comprehensive, voluminous, etc.) may be advantageously partitioned into smaller blocks or areas comprising, for example, one or more tiles to respectively represent heat map values of observed or expected wireless signals (e.g., RSSI, RTT, etc.). In some instances, one or more heat map tiles may cover an area associated with or otherwise identifiable via one or more location context identifiers (LCIs), as will also be seen. As used herein, a location context identifier (LCI) may refer to a locally defined geographic area that may be used to store or access geographically linked information associated with that area, such as, for example, a building, a particular floor or portion of a building, a wing of a building, different terminals in an airport, other indoor or like areas, etc. that may or may not be mapped according to a global coordinate system. Depending on an implementation, one or more relevant heat map tiles may be provided to a mobile device, such as instead of a complete radio heat map, for example, and used, at least in part, to estimate or refine a location of the device in an indoor or like area of interest in a more effective or efficient manner. It should be noted that in certain implementations one or more heat map tiles, such as associated with a suitable metadata structure, for example, may or may not be rectangular or overlapping.

More specifically, in some instances, such as if a location of a mobile device is uncertain, for example, a message or like communication having abbreviated positioning assistance data may, for example, be provided for use by the mobile device for obtaining at least a coarse position fix. Abbreviated positioning assistance data may be provided by a suitable server and may comprise, for example, identities or locations of wireless transmitters, a radio heat map, heat map tile, LCI, recent position fix obtained via an SPS, etc., just to illustrate a few possible implementations. Based, at least in part, on a coarse position fix, an initial heat map tile covering a rough location of a mobile device may, for example, be selected and provided to the mobile device (e.g., for a download, etc.) for localization. In some instances, such as if an initial tile is not sufficient or otherwise suitable, for example, a more detailed radio heat map covering an initial heat map tile may be obtained or provided to a mobile device for more accurate location determination, as will also be seen.

FIG. 1 is a schematic diagram illustrating features associated with an implementation of an example operating environment 100 capable of facilitating or supporting one or more processes or operations for a relatively faster time-to-first-fix. As described below, one or more processes or operations for a relatively faster time-to-first-fix may be implemented in connection with one or more radio heat maps for an indoor or like environment that may be employed by a mobile device 102, for example. It should be appreciated that operating environment 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, operating environment 100 may comprise, for example, one or more satellites 104, base transceiver stations 106, wireless transmitters 108, etc. capable of communicating with mobile device 102 via wireless communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Base transceiver stations 106, wireless transmitters 108, etc. may be of the same or similar type, for example, or may represent different types of devices, such as access points, radio beacons, cellular base stations, femtocells, or the like, depending on an implementation. At times, one or more wireless transmitters, such as wireless transmitters 108, for example, may be capable of transmitting as well as receiving wireless signals.

Although not shown, in some instances, operating environment 100 may, for example, include a relatively larger number of wireless transmitters 108 associated with an indoor or like area of interest. To illustrate, typically, although not necessarily, a larger number of wireless transmitters 108, such as access points, femtocells, etc., may, for example, correspond to or correlate with a more voluminous or comprehensive radio heat map. As was indicated, at times, this may lead to or result in having relatively large positioning assistance data associated with an indoor or like area of interest, which may at least partially preclude position determination, location or navigation services, affect power consumption, etc. of mobile device 102. Of course, these are merely details relating to operating environment 100, and claimed subject matter is not so limited.

In some instances, one or more base transceiver stations 106, wireless transmitters 108, etc. may, for example, be operatively coupled to a network 112 that may comprise one or more wired or wireless communications or computing networks capable of providing suitable information, such as via one or more wireless communication links 114, 110, etc. As will be seen, information may include, for example, positioning assistance data, such as a radio heat map, heat map tile, LCI, recent position fix obtained via an SPS, or the like. At times, information may include, for example, abbreviated positioning assistance data, such as identities or locations of one or more base transceiver stations 106, wireless transmitters 108, or the like to facilitate or support one or more operations or processes associated with operating environment 100. As a way of illustration, positioning assistance data may, for example, be provided in the form of a digital map, look-up table, mathematical formula, suitable model, algorithm, heat map metadata, etc., which may depend, at least in part, on an application, network, environment, LCI, radio heat map, or the like. In an implementation, network 112 may be capable of facilitating or supporting communications between suitable computing platforms or devices, such as, for example, mobile device 102, one or more base transceiver stations 106, wireless transmitters 108, as well as one or more servers associated with operating environment 100. In some instances, servers may include, for example, a location server 116, positioning assistance server 118, as well as one or more other servers, indicated generally at 120 (e.g., navigation, information, map, etc. server, etc.), capable of facilitating or supporting one or more operations or processes associated with operating environment 100.

As will be described in greater detail below, location server 116 may provide an indication of a coarse location of mobile device 102, such as within an indoor or like area of interest, for example, associated with operating environment 100. In addition, at times, location server 116 may, for example, provide a location context identifier (LCI) for a particular indoor or like area of interest, as will also be seen. For example, an LCI may comprise or be associated with a locally defined area, such as a particular floor of a building or other indoor or like area of interest that is not mapped according to a global coordinate system, just to illustrate one possible implementation. Thus, in some instances, such as at or upon entry of an indoor or like area of interest, for example, mobile device 102 may communicate a request to location server 116 to provide one or more LCIs covering the area or adjacent areas, if applicable. Here, a request may reference or otherwise include, for example, a coarse location of mobile device 102, as was indicated, such that location server 116 may associate the coarse location of mobile device 102 with indoor or like areas covered by one or more LCIs, and then communicate relevant LCIs to mobile device 102. In some instances, mobile device 102 may utilize one or more received LCIs, in whole or in part, in subsequent messages with a suitable server, such as server 120, for example, to obtain navigation, map, or other information relevant to an area identified by one or more LCIs (e.g., a digital map, routeability graph, etc.). As will also be seen, positioning assistance server 118 may, for example, provide abbreviated positioning assistance data, such as identities or locations of relevant wireless transmitters, a radio heat map covering an area of multiple LCIs, though claimed subject matter is not so limited. For example, in some instances, abbreviated positioning assistance data may comprise a selected heat map tile that may be used, at least in part, to compute a coarse position fix of mobile device 102 in an indoor or like area of interest identifiable via a single LCI.

Even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, servers 116, 118, 120, or the like. In some instances, network 112 may facilitate or support femtocell-based operative regions of coverage, for example. Again, these are merely example implementations, and claimed subject matter is not limited in this regard.

With this in mind, techniques for a relatively faster time-to-first-fix are presented herein that may allow a location-aware mobile device, such as mobile device 102 of FIG. 1, for example, to compute an initial estimate of its location in a more effective or efficient manner. For example, in at least one implementation, a suitable mobile device may employ, at least in part, so-called hierarchical heat map structures, such as a sparse radio heat map and a more detailed tiled radio heat map to facilitate or support relatively faster indoor localization. More specifically, a sparse radio heat map may be provided by a suitable server and used, at least in part, by a mobile device to compute a first or initial position fix, for example. A computed position may be subsequently refined, for example, via a more detailed tiled radio heat map covering an initial position fix. A more detailed tiled radio heat map may be provided to a mobile device by a suitable server, for example, in response to an initial position fix obtained by the mobile device, just to illustrate one possible implementation. For purposes of explanation, a sparse radio heat map may comprise, for example, a lower-resolution radio heat map having expected signal signatures at grid points that are more spread out or less densely populated (e.g., eight-meter, ten-meter, etc. spacing) so as to cover a larger area. For example, at times, a sparse radio heat map may have RSSI, RTT, etc. values at every twenty-five square meters (e.g., grid points) rather than at every square meter, just to illustrate one possible implementation. In turn, a more detailed radio heat map may have expected signal signatures at more closely-spaced or more densely populated grid points (e.g., one-meter, two-meter, etc. spacing) but with the same or similar heat map metadata size as a sparse radio heat map. In other words, in some instances, a more detailed radio heat map may cover the same or similar area with increased precision or resolution, such as for purposes of indoor localization, for example. It should be appreciated that in some instances, a size of heat map metadata associated with a sparse radio heat map may be different (e.g., smaller, etc.), such as for the same or similarly-sized area, for example, than that of a more detailed tiled radio heat map. Of course, these are merely details relating to radio heat maps, and claimed subject matter is not limited in this regard.

As indicated above, a mobile device may obtain a coarse estimate of its location based, at least in part, on positioning assistance data provided by a suitable server, such as location server 116 of FIG. 1, for example. In some instances, positioning assistance data may comprise, for example, locations or identities (e.g., MAC addresses, etc.) of one or more wireless transmitters positioned at known locations within an indoor or like area of interest. At times, a mobile device may, for example, obtain a coarse estimate of its location by measuring a range to one or more of known transmitter locations, though claimed subject matter is not so limited. For example, in some implementations, a coarse location of a mobile device may be obtained based, at least in part, on a user input, recent position fix obtained from an SPS, or the like.

In some instances, having received a coarse position fix from a mobile device, a suitable server, such as positioning assistance server 118 of FIG. 1, for example, may provide or transmit to the mobile device a message comprising abbreviated positioning assistance data. Abbreviated positioning assistance data may include, for example, a sparse radio heat map covering a coarse position fix and, in some instances, an area of multiple LCIs, just to illustrate one possible implementation. Here, a mobile device may utilize, in whole or in part, a provided sparse radio heat map to identify or locate a single LCI within which the mobile device is located, such as among multiple provided LCIs, for example, or potentially a heat map tile within the LCI, if applicable, and may communicate this information (e.g., an indication of a coarse location, etc.) to a server. In response, a server may provide a more detailed radio heat map for an identified LCI, such as in the form of a relevant detailed heat map tile, for example, which a mobile device may employ to obtain a more accurate or precise position fix.

According to an implementation, heat map values comprising a more detailed radio heat map for an identified LCI may, for example, be provided. Subsequently, such as while a mobile device is traveling within an indoor or like area of interest, one or more detailed radio heat maps or heat map tiles, such as covering respective single LCIs, for example, may be obtained or provided for use by a mobile device in a similar fashion. In some instances, such as if a mobile device has traveled to or arrived at a new location (e.g., another shopping mall, etc.), for example, a server may again provide a sparse radio heat map to identify a relevant single LCI so as to initiate a location determination process in connection with hierarchical heat map structures, as discussed above.

Thus, as described herein, one or more hierarchical heat map structures may facilitate or support a relatively faster time-to-first-fix, such as, for example, by allowing for a more effective or efficient download time (e.g., via a smaller size of heat map metadata, heat map tile, etc.), utilizing a lesser amount of processing resources, or the like. For this example, since heat map structures are typically, although not necessarily, hierarchical, a hierarchical compression scheme may, for example, be employed, in whole or in part. For example, a mobile device may download a first part of a compressed heat map metadata file and decode a sparse radio heat map. Subsequently, a mobile device may download the rest of the file and decode one or more detailed radio heat map(s) or heat map tile(s), if suitable. Of course, these are merely details relating to a compression scheme that may be used herein, at least in part, and claimed subject matter is not limited in this regard.

Figure 2:
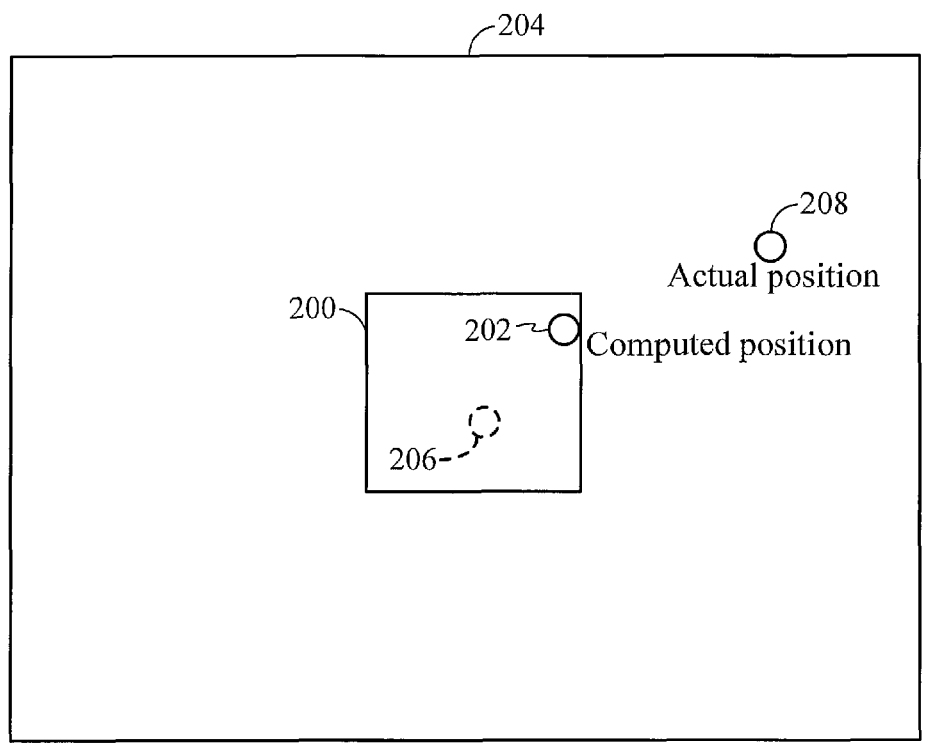
FIGS. 2-3 are schematic illustrations of an implementation of an example sequential tiling technique.
Figure 3:
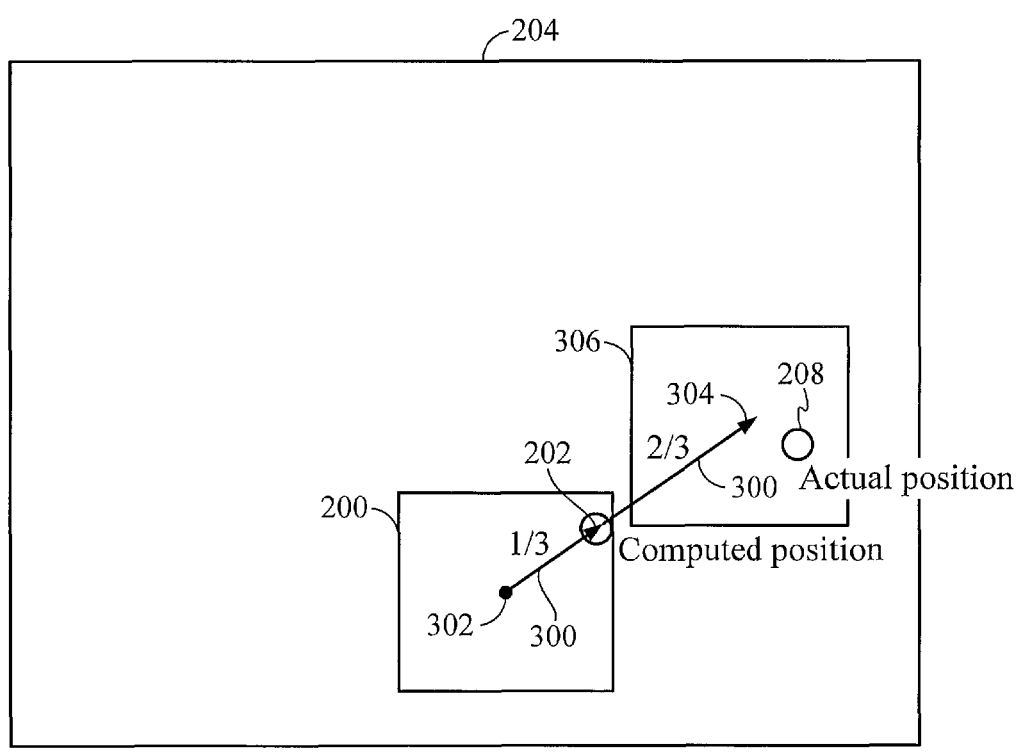

Attention is now drawn to FIGS. 2-3, which are schematic illustrations of an implementation of an example sequential tiling technique that may be performed, in whole or in part, to facilitate or support a relatively faster time-to-first-fix of a location-aware mobile device, such as mobile device 102 of FIG. 1, for example. These figures may illustrate an example progression of a sequential tiling technique, though claimed subject matter is not limited to such an example progression, of course. In addition, to simplify discussion, features or aspects shown in FIG. 2 that correspond to like features or aspects illustrated in FIG. 3 may be given corresponding reference numbers, where applicable.

As seen in FIG. 2, provided abbreviated positioning assistance data may comprise, for example, a single selected heat map tile 200 that may be used, at least in part, for estimating a coarse position fix, referenced via a computed position 202, such as within an indoor or like area of interest identifiable via an LCI 204. In some instances, heat map tile 200 may comprise, for example, a center tile selected based, at least in part, on a topology of an indoor or like environment (e.g., structural features, area constraints, etc.), though claimed subject matter is not so limited. For example, heat map tile 200 may be selected in connection with determining a centroid of LCI 204, an applicable indoor navigation area, radio heat map, etc., or any combination thereof, such as using one or more appropriate techniques. Optionally or alternatively, heat map tile 200 may, for example, be selected based, at least in part, on observed signals from wireless transmitters "visible" within LCI 204. For example, in some instances, a heat map tile with relatively high heat map value(s), such from access points having stronger signals observed within an area of LCI 204, for example, may be selected. As such, depending on an implementation, a selected heat map tile, such as tile 200, for example, may or may not be not centered within an area of LCI 204. Thus, in at least one implementation, instead of providing a complete radio heat map covering an area of LCI 204, a single heat map tile located at about a center of LCI 204, such as heat map tile 200, for example, may be selected and provided to a mobile device (e.g., for a download, etc.). Again, this may facilitate or support more effective or efficient use of processing resources or memory of a mobile device, network bandwidth, or the like.

Observed or measured heat map values associated with selected heat map tile 200 may be evaluated in some manner, such as via a suitable statistical or motion model, for example, to estimate computed position 202 of a mobile device. By way of example but not limitation, a sequential Monte Carlo (SMC) model, such as a particle filter, for example, may be used. In some instances, a particle filter may propagate "particles" representing likelihoods of particular associated motion states at locations within a suitable space. Here, for example, a particle filter may propagate measurements (e.g., particles, etc.) to a point with a higher probability distribution or likelihood of computed position 202 given all or most observed heat map values within selected heat map tile 200. Of course, claimed subject matter is not so limited to one particular model or approach. Any other suitable models or approaches, statistical or otherwise, that may facilitate or support computing an initial estimate of a position of a mobile device, such as within selected tile 200, for example, may be used, in whole or in part.

In some instances, an initial position of a mobile device may, for example, be estimated to be well within selected heat map tile 200, as referenced generally via a dashed line at 206. For example, initial position 206 may be estimated to be in a sufficiently close proximity to a center of selected heat map tile 200 or at least further away from its margins, just to illustrate one possible implementation. In such a case, an inference may be made that initial position 206 comprises or is otherwise representative of an actual position of a mobile device. Accordingly, here, no additional detailed radio heat map or heat map tile, such as for further position estimation, for example, may be needed or otherwise useful. In at least one implementation, optionally or alternatively, an additional heat map tile centered at initial position 206 may be provided to a mobile device, such as to confirm or refine its position, for example. Likewise, for this example, one or more suitable statistical or motion modeling approaches, such as a particle filter discussed above, for example, may be employed.

In an implementation, if, however, an initial position of a mobile device is estimated to be at an edge or margin of an area covered by selected heat map tile 200, as referenced via computed position 202, for example, it may be inferred that a position fix or actual position of the mobile device may likely be outside of the area, as illustrated generally at 208. Here, computed position 202 may, for example, be used, at least in part, as an indication of a coarse location or a direction towards a position fix of a mobile device, such as an estimate of actual position 208. In some instances, this indication of a direction may be used, at least in part, to compute a position fix of a mobile device, such as actual position 208, for example. More specifically, as illustrated in FIG. 3, at times, a vector 300 representative of a direction towards actual position 208 may, for example, be specified (e.g., via input signals, instructions, etc.) to extend or emanate from a center 302 of selected heat map tile 200 in the direction of computed position 202. Vector 300 may be extended through or beyond computed position 202 in a suitable manner, such as, for example, by utilizing a ratio of its length or magnitude, just to illustrate one possible implementation. By way of example but not limitation, in certain simulations or experiments, the ratio 1:2 was used, such that a line segment representing extended vector 300, such as from computed position 202 to a terminal point 304, for example, would be about two-times of the length or magnitude of initial vector 300 (e.g., from 302 to 202, etc.). Here, an additional heat map tile 306 centered at terminal point 304 may, for example, be obtained and provided to a mobile device, such as for position determination in connection with a particle filter, as discussed above. This operation may be repeated until it is inferred that actual position 208 is located within an additional heat map tile, such as heat map tile 306, for example. Here, a position fix of a mobile device within additional heat map tile 306 may, for example, be refined or confirmed, such as via providing an additional heat map tile centered at actual position 208, as was indicated.

It should be noted that employing a heat map tile of a reasonable or otherwise sufficient size may be important or useful. To illustrate, if an applicable LCI comprises a relatively large number of heat map tiles (e.g., one hundred, etc.), wireless signals observed at a mobile device may be too weak or not "visible" in a selected tile, such as a center tile, for example, which may preclude position determination. Thus, at times it may be useful to utilize an LCI having a relatively smaller or otherwise sufficient number of heat map tiles (e.g., nine or 3×3 tiling structure, twenty-five or 5×5 tiling structure, forty-nine or 7×7 tiling structure, etc.), for example. This may, for example, increase a likelihood that grid points in a selected tile may have one or more access points in common with other potential positions within the LCI. Claimed subject matter is not limited to these particular sizes, of course.

Accordingly, in some instances, by providing a relatively smaller heat map metadata, such as in the form of one or more relevant heat map tiles instead of a complete radio heat map covering a larger indoor or like area of interest, for example, a relatively faster time-to-first-fix may be implemented. Here, without loss of generality, a solution for a sequential tiling process or technique may converge, for example, in:

$$\text{ceil}[\log_3(S)] \tag{1}$$

where S denotes a number of heat map tiles in an LCI.

Thus, by way of example but not limitation, in certain simulations or experiments, it has been observed that for an area covered by a reasonably-sized LCI, such as an LCI comprising approximately twenty-five heat map tiles, for example, a solution may converge in about three iterations. As alluded to previously, this may provide benefits, such as, for example, computing a first or initial position fix via downloading approximately three or four (e.g., to refine, confirm, etc. a position) heat map tiles instead of potentially twenty-five tiles. Of course, claimed subject matter is not limited to such an observation.

It should be appreciated that in some instances a first or initial position of a mobile device may be computed, at least in part, in connection with one or more non-heat map processes or algorithms, for example, without deviating from the scope of claimed subject matter. For example, at times, such as before or prior to providing a radio heat map, heat map tile, etc., a suitable server (e.g., location server 116 of FIG. 1, etc.) may provide locations of known wireless transmitters (e.g., access points, etc.) to a mobile device for initial position determination in connection with a suitable process or algorithm. By way of example but not limitation, a centroid of one or more stronger measurements of one or more observed wireless signals (e.g., a centroid of one or more strongest "visible" access points, etc.), as discussed above, a minimum mean square error (MMSE) using RSSI measurements, an MMSE using RTT measurements, etc., or any combination thereof may be used. To illustrate, RSSI measurements of all or most access points "visible" within a suitable area, such as covered by an LCI, for example, may be used to compute a first or initial position fix corresponding to an RSSI measurement at a point that minimizes a mean square error with respect to other RSSI measurements (e.g. potential points or positions, etc.) within the area. Thus, a point indicative of a first or initial position of a mobile device may, for example, be used, at least in part, as a starting point with respect to one or more position determination techniques discussed above (e.g., to request a tile, identify an LCI, etc.). Subsequently, such as after a first or initial position fix is obtained, for example, a mobile device may communicate a request or message to a suitable server, such as positioning assistance server 118 of FIG. 1, for example, to provide a more detailed radio heat map or heat map tile so as to refine its position, if applicable.

Figure 4:
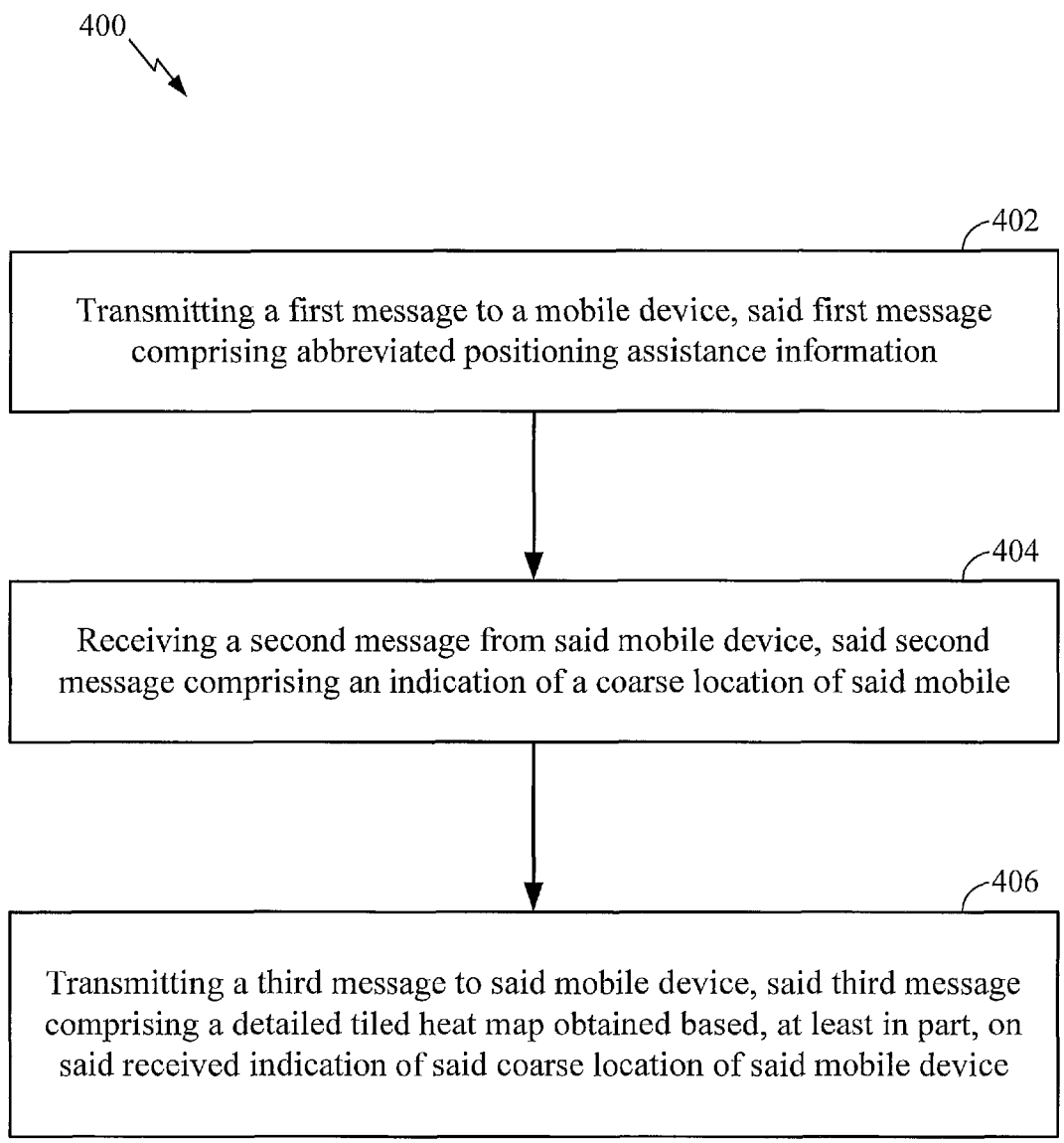
FIG. 4 is a flow diagram illustrating an implementation of an example process that may be performed to facilitate or support techniques for a relatively faster time-to-first-fix.

Attention is now drawn to FIG. 4, which is a flow diagram illustrating an implementation of an example process 400 that may be performed, in whole or in part, to facilitate or support one or more operations or techniques for a relatively faster time-to-first-fix for use in or with a mobile device, such as mobile device 102 of FIG. 1, for example. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 400 may, for example, begin at operation 402 with transmitting a first message to a mobile device, such a message comprising abbreviated positioning assistance data. For example, depending on an implementation, abbreviated positioning assistance data may comprise identities or locations of one or more wireless transmitters, a radio heat map covering an area of a single or multiple LCIs, a selected heat map tile, recent position fix obtained via an SPS or user input, or the like. With regard to operation 404, a second message may, for example, be received from a mobile device, such a message comprising an indication of a coarse location of the mobile device. As previously mentioned, a coarse location of a mobile device may be estimated based, at least in part, on abbreviated positioning assistance data, for example, and may be transmitted or communicated via one or more suitable communication links, such as wireless communication links 110, 114, etc. of FIG. 1. At times, an indication of a coarse location may comprise, for example, a relevant LCI among multiple provided LCIs, signals from one or more wireless transmitters observed at a mobile device, position fix computed in connection with an initial heat map tile centered within an area of an LCI, or the like. At operation 406, a third message may, for example, be transmitted to a mobile device, such a message comprising a detailed tiled radio heat map obtained based, at least in part, on a received indication of a coarse location of the mobile device. For example, in some instances, a detailed tiled radio heat map may cover an initial heat map tile and may be provided to a mobile device for more accurate location determination, just to illustrate one possible implementation.

Figure 5:
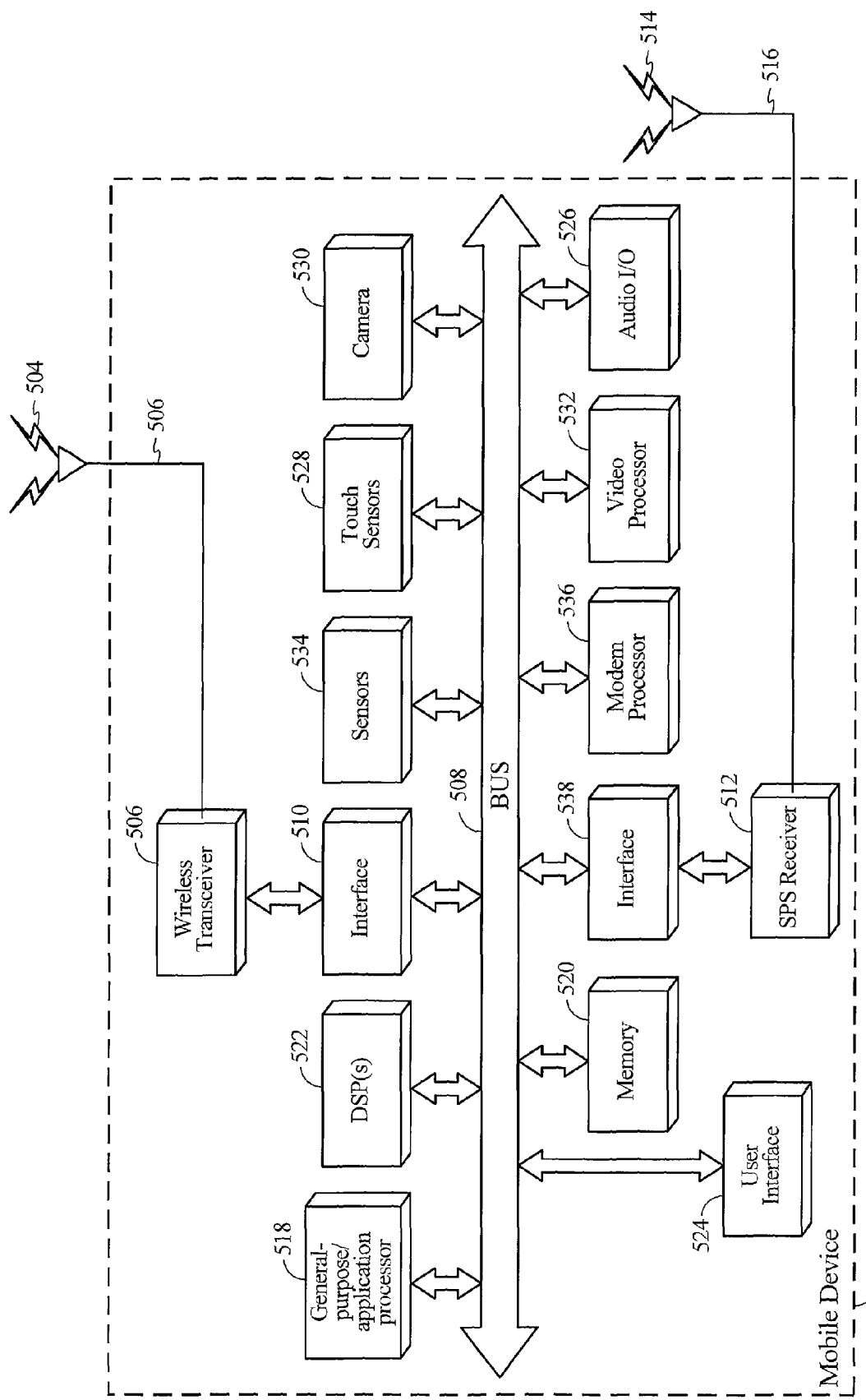
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate or support one or more operations or techniques for a relatively faster time-to-first-fix, such as for positioning in an indoor or like environment. An example computing environment may comprise, for example, a mobile device 500 that may include one or more features or aspects of mobile device 102 of FIG. 1, though claimed subject matter is not so limited. For example, in some instances, mobile device 500 may comprise a wireless transceiver 502 capable of transmitting or receiving wireless signals, referenced generally at 504, such as via an antenna 506 over a suitable wireless communications network. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 500 may, for example, comprise an SPS or like receiver 512 capable of receiving or acquiring one or more SPS or other suitable wireless signals 514, such as via an SPS or like antenna 516. SPS receiver 512 may process, in whole or in part, one or more acquired SPS signals 514 for estimating a location of mobile device 500. In some instances, one or more general-purpose application processors 518, memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with one or more techniques for a relatively faster time-to-first-fix, for example, may be performed, at least in part, in memory 520, suitable registers or buffers (not shown). Although not shown, it should be appreciated that in at least one implementation one or more processors 518, memory 520, DSPs 522, or like specialized devices or processors may comprise one or more processing modules capable of transmitting a first message to a mobile device, such a first message comprising abbreviated positioning assistance data; receiving a second message from the mobile device, such a second message comprising an indication of a coarse location of the mobile device; and transmitting a third message to the mobile device, such a third message comprising a detailed tiled radio heat map obtained based, at least in part, on the received indication of the coarse location of the mobile device. It should also be noted that all or part of one or more processing modules may be implemented using or otherwise including hardware, firmware, software, or any combination thereof.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. In some implementations, mobile device 500 may optionally include a dedicated audio input/output (I/O) device 526 comprising, for example, a dedicated speaker, microphone, digital to analog circuitry, analog to digital circuitry, amplifiers, gain control, or the like. It should be understood, however, that this is merely an example of how audio I/O device 526 may be implemented, and that claimed subject matter is not limited in this respect. As seen, mobile device 500 may comprise one or more touch sensors 528 responsive to touching or like pressure applied on a keyboard, touch screen, or the like.

In an implementation, mobile device 500 may comprise, for example, a camera 530, dedicated or otherwise, such as for capturing still or moving imagery. Camera 530 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 518, DSP 522, or the like. Optionally or alternatively, a video processor 532, dedicated or otherwise, may perform conditioning, encoding, compression, or manipulation of signals representing one or more captured images. Additionally, video processor 532 may, for example, decode or decompress one or more stored images for presentation on a display (not shown) of mobile device 500.

Mobile device 500 may comprise one or more sensors 534 coupled or connected to bus 508, such as, for example, one or more inertial sensors, ambient environment sensors, or the like. Inertial sensors of sensors 534 may comprise, for example, one or more accelerometers (e.g., collectively responding to acceleration of mobile device 500 in one, two, or three dimensions, etc.), gyroscopes or magnetometers (e.g., to support one or more compass applications, etc.), etc., just to illustrate a few examples. Ambient environment sensors of mobile device 500 may comprise, for example, one or more temperature sensors, barometric pressure sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, communications, gaming or the like.

In a particular implementation, mobile device 500 may comprise a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
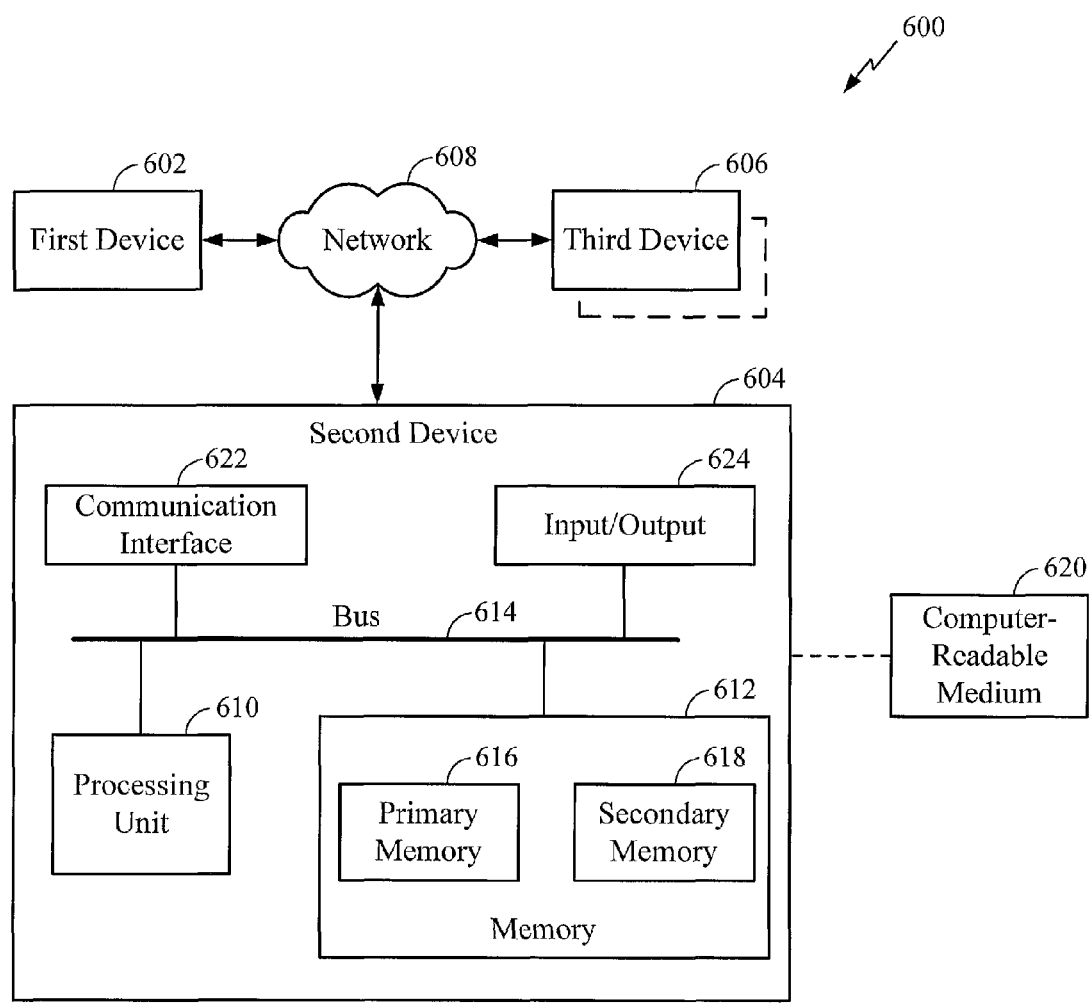
FIG. 6 is a schematic diagram illustrating an implementation of an example computing environment associated with a server.

FIG. 6 is a schematic diagram illustrating an implementation of an example computing environment or system 600 that may be associated with or include one or more servers or other devices capable of partially or substantially implementing or supporting one or more operations or techniques for a relatively faster time-to-first-fix for positioning in an indoor or like environment, such as discussed above in connection with FIG. 1, for example. Computing environment 600 may include, for example, a first device 602, a second device 604, a third device 606, etc., which may be operatively coupled together via a communications network 608. In some instances, first device 602 may comprise a server capable of providing positioning assistance data, such as, for example, locations of known wireless transmitters, radio heat map, heat map tile, base station almanac, or the like. First device 602 may also comprise a server capable of providing an LCI to a requesting mobile device based, at least in part, on a rough estimate of a location of the mobile device. First device 602 may also comprise a server capable of providing indoor positioning assistance data relevant to a location of an LCI specified in a request from a mobile device. Second device 604 or third device 606 may comprise, for example, mobile devices, just to illustrate one possible implementation. In addition, communications network 608 may comprise one or more wireless transmitters, such as access points, femtocells, or the like. Of course, claimed subject matter is not limited in scope in these respects.

First device 602, second device 604, or third device 606 may be representative of any device, appliance, platform, or machine that may be capable of exchanging information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a storage medium.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards, A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining positioning assistance data, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
transmitting a first message to a mobile device, said first message comprising a selected heat map tile;
receiving a second message from said mobile device, said second message comprising a coarse location of said mobile device within said selected heat map tile; and
transmitting a third message to said mobile device, said third message comprising a detailed tiled radio heat map for a locally defined geographic area selected, at least in part, by using said coarse location and an indication of a direction from a center of said selected heat map tile towards a position fix of said mobile device as estimated via a vector computed, at least in part, by using an additional heat map tile centered at a terminal point of said vector.

2. The method of claim 1, wherein said selected heat map tile comprises locations of one or more wireless transmitters.

3. The method of claim 2, wherein said one or more wireless transmitters comprises one or more access points positioned at known locations.

4. The method of claim 1, wherein said coarse location of said mobile device is estimated based, at least in part, on one or more wireless signaling measurements of one or more wireless transmitters.

5. The method of claim 4, wherein said one or more wireless signaling measurements comprises at least one measurement indicative of a measured range to said one or more wireless transmitters.

6. The method of claim 4, wherein said coarse location of said mobile device is estimated in connection with at least one of the following: a centroid of one or more stronger measurements of said one or more wireless signaling measurements; a minimum mean square error (MMSE) estimation of said one or more wireless signaling measurements; or any combination thereof.

7. The method of claim 4, wherein said one or more wireless signaling measurements comprises at least one of the following: a received signal strength indicator (RSSI) measurement; a round-trip delay time (RTT) measurement; or any combination thereof.

8. The method of claim 1, wherein said selected heat map tile comprises a sparse radio heat map.

9. The method of claim 1, wherein said detailed tiled radio heat map covers an area smaller than an area covered by a sparse radio heat map.

10. The method of claim 1, wherein said detailed tiled radio heat map covers an area substantially the same as an area covered by a sparse radio heat map.

11. The method of claim 10, wherein said sparse radio heat map covers an area identifiable via a plurality of location context identifiers (LCIs).

12. The method of claim 1, wherein said detailed tiled radio heat map covers an area identifiable via a single LCI.

13. The method of claim 1, wherein said selected heat map tile comprises a selected radio heat map covering a portion of an area that includes said coarse location of said mobile device.

14. The method of claim 13, wherein said portion of said area is identifiable via an LCI.

15. The method of claim 14, wherein said LCI comprises at least one of the following: a plurality of rectangular heat map tiles; or a single rectangular heat map tile.

16. The method of claim 13, wherein said selected radio heat map comprises a single heat map tile.

17. The method of claim 1, wherein said position fix is estimated via said vector computed using, at least in part, an area associated with at least one more additional heat map tile.

18. The method of claim 1, wherein said detailed tiled radio heat map comprises a heat map tile.

19. The method of claim 1, wherein said locally defined geographic area comprises a floor of a building.

20. An apparatus comprising:
a mobile device comprising:
a wireless transceiver to communicate with a wireless network; and
one or more processors programmed with instructions to:
obtain a first message received at said wireless transceiver, said first message comprising a selected heat map tile;
initiate a transmission of a second message via said wireless transceiver, said second message comprising a coarse location of said mobile device within said selected heat map tile; and
obtain a third message received at said wireless transceiver, said third message comprising a detailed tiled radio heat map for a locally defined geographic area selected, at least in part, by using said coarse location and an indication of a direction from a center of said selected heat map tile towards a position fix of said mobile device as estimated via a vector computed, at least in part, by using an additional heat map tile centered at a terminal point of said vector.

21. The apparatus of claim 20, wherein said selected heat map tile comprises locations of one or more wireless transmitters.

22. The apparatus of claim 20, wherein said coarse location of said mobile device is estimated based, at least in part, on one or more wireless signaling measurements of said one or more wireless transmitters.

23. The apparatus of claim 20, wherein said selected heat map tile comprises a sparse radio heat map.

24. The apparatus of claim 20, wherein said selected heat map tile comprises a selected heat map tile covering a portion of an area that includes said coarse location of said mobile device.

25. The apparatus of claim 20, wherein said position fix is estimated via said vector computed using, at least in part, an area associated with at least one more additional heat map tile.

26. An apparatus comprising:
means for transmitting a first message to a mobile device, said first message comprising a selected heat map tile;
means for receiving a second message from said mobile device, said second message comprising a coarse location of said mobile device within said selected heat map tile; and
means for transmitting a third message to said mobile device, said third message comprising a detailed tiled radio heat map for a locally defined geographic area selected, at least in part, by using said coarse location and an indication of a direction from a center of said selected heat map tile towards a position fix of said mobile device as estimated via a vector computed, at least in part, by using an additional heat map tile centered at a terminal point of said vector.

27. The apparatus of claim 26, wherein said selected heat map tile comprises locations of one or more wireless transmitters.

28. The apparatus of claim 26, wherein said coarse location of said mobile device is estimated based, at least in part, on one or more wireless signaling measurements of one or more wireless transmitters.

29. The apparatus of claim 28, wherein said one or more wireless signaling measurements comprises at least one measurement indicative of a measured range to said one or more wireless transmitters.

30. The apparatus of claim 28, wherein said coarse location of said mobile device is estimated in connection with at least one of the following: a centroid of one or more stronger measurements of said one or more wireless signaling measurements; a minimum mean square error (MMSE) estimation of said one or more wireless signaling measurements; or any combination thereof.

31. The apparatus of claim 28, wherein said one or more wireless signaling measurements comprises at least one of the following: a received signal strength indicator (RSSI) measurement; a round-trip delay time (RTT) measurement; or any combination thereof.

32. The apparatus of claim 26, wherein said selected heat map tile comprises a sparse radio heat map.

33. The apparatus of claim 26, wherein said detailed tiled radio heat map covers an area smaller than an area covered by a sparse radio heat map.

34. The apparatus of claim 26, wherein said detailed tiled radio heat map covers an area substantially the same as an area covered by a sparse radio heat map.

35. The apparatus of claim 34, wherein said sparse radio heat map covers an area identifiable via a plurality of location context identifiers (LCIs).

36. The apparatus of claim 26, wherein said detailed tiled radio heat map covers an area identifiable via a single LCI.

37. The apparatus of claim 26, wherein said selected heat map tile comprises a selected radio heat map covering a portion of an area that includes said coarse location of said mobile device.

38. The apparatus of claim 37, wherein said selected radio heat map comprises a single heat map tile.

39. The apparatus of claim 26, wherein said position fix is estimated via said vector computed using, at least in part, an area associated with at least one more additional heat map tile.

40. The apparatus of claim 26, wherein said detailed tiled radio heat map comprises a heat map tile.

41. An article comprising:
a non-transitory storage medium having instructions stored thereon executable by a special purpose computing platform to:
initiate a transmission of a first message to a mobile device, said first message comprising a selected heat map tile;
obtain a second message received from said mobile device, said second message comprising a coarse location of said mobile device within said selected heat map tile; and
initiate a transmission of a third message to said mobile device, said third message comprising a detailed tiled radio heat map for a locally defined geographic area selected, at least in part, by using said coarse location and an indication of a direction from a center of said selected heat map tile towards a position fix of said mobile device as estimated via a vector computed, at least in part, by using an additional heat map tile centered at a terminal point of said vector.

42. The article of claim 41, wherein said selected heat map tile comprises locations of one or more wireless transmitters.

43. The article of claim 41, wherein said selected heat map tile comprises a sparse radio heat map.

44. The article of claim 41, wherein said selected heat map tile comprises a selected heat map tile covering a portion of an area that includes said coarse location of said mobile device.

* * * * *